US012699568B2

(12) United States Patent
Alcorta Lozano et al.

(10) Patent No.: US 12,699,568 B2
(45) Date of Patent: Aug. 4, 2026

(54) RUNTIME ADAPTIVE PREFETCHING IN A MANY-CORE SYSTEM

(71) Applicant: Ampere Computing LLC, Santa Clara, CA (US)

(72) Inventors: Erika Susana Alcorta Lozano, Austin, TX (US); Mahesh Jagdish Madhav, Portland, OR (US); Raymond Scott Tetrick, Portland, OR (US)

(73) Assignee: Ampere Computing LLC, Santa Clara, CA (US)

( * ) Notice: Subject to any disclaimer, the term of this patent is extended or adjusted under 35 U.S.C. 154(b) by 0 days.

(21) Appl. No.: 18/639,815

(22) Filed: Apr. 18, 2024

(65) Prior Publication Data

US 2024/0354110 A1 Oct. 24, 2024

Related U.S. Application Data

(60) Provisional application No. 63/497,579, filed on Apr. 21, 2023.

(51) Int. Cl.
*G06F 9/30* (2018.01)
*G06F 9/38* (2018.01)
G06F 12/0862 (2016.01)

(52) U.S. Cl.
CPC ........ *G06F 9/3802* (2013.01); *G06F 12/0862* (2013.01); *G06F 2212/6024* (2013.01); *G06F 2212/6028* (2013.01)

(58) Field of Classification Search
CPC .............. G06F 9/3802; G06F 12/0862; G06F 2212/6024; G06F 2212/6028
See application file for complete search history.

(56) References Cited

U.S. PATENT DOCUMENTS

| | | | | |
|---|---|---|---|---|
| 10,437,718 | B1 * | 10/2019 | Anghel | G06N 20/00 |
| 11,157,283 | B2 * | 10/2021 | Valerio | G06F 9/3802 |
| 2018/0024932 | A1 * | 1/2018 | Nachimuthu | G06F 12/109 |
| 2021/0011726 | A1 * | 1/2021 | Alam | G06F 9/30043 |
| 2022/0137974 | A1 * | 5/2022 | McDonald | G06F 9/3848 |
| | | | | 712/237 |

* cited by examiner

*Primary Examiner* — Corey S Faherty
(74) *Attorney, Agent, or Firm* — Muncy, Geissler, Olds, & Lowe, P.C.

(57) ABSTRACT

Disclosed are techniques for runtime adaptive prefetching in a many-core system. In an aspect, a method for runtime adaptive prefetching in a many-core system may include periodically performing the following steps: determining, for a first processor core in a many-core system, a workload classification based on at least one performance indicator of the first processor core; determining a first prefetching configuration from a plurality of prefetching configurations based on the workload classification; and configuring at least the first processor core according to the first prefetching configuration.

18 Claims, 5 Drawing Sheets

Start

500

510 — Determine, for a first processor core in a many-core system, a workload classification based on at least one performance indicator of the first processor core 520 — Determine a first prefetching configuration from a plurality of prefetching configurations based on the workload classification 530 — Configure at least the first processor core according to the first prefetching configuration.

*Performed during runtime of the many-core system*

200

Applications 206

Prefetch Configuration 214

Read PMU 216

ML model 218

Prefetch Configuration 220

Operating System 204

Perf syscall 210

MSR Interface 212

Firmware 202

FW Interface 208

SoC 100

Core 102

PMU 104

MSR 106

Core 102

Core 102

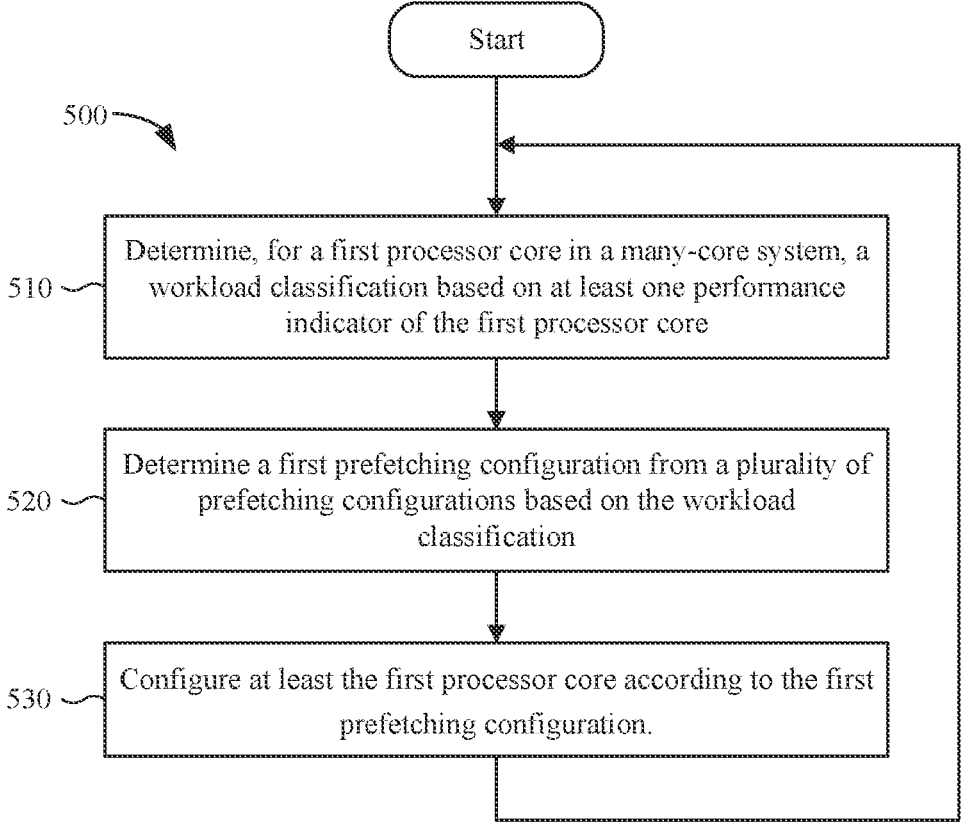

Start

500

510 — Determine, for a first processor core in a many-core system, a workload classification based on at least one performance indicator of the first processor core 520 — Determine a first prefetching configuration from a plurality of prefetching configurations based on the workload classification 530 — Configure at least the first processor core according to the first prefetching configuration.

*FIG. 5*

*Performed during runtime of the many-core system*

RUNTIME ADAPTIVE PREFETCHING IN A MANY-CORE SYSTEM

CROSS-REFERENCE TO RELATED APPLICATION

This application claims priority to U.S. Provisional Patent Application No. 63/497,579, filed Apr. 21, 2023, entitled "RUNTIME ADAPTIVE PREFETCHING IN A MANY-CORE SYSTEM," which is assigned to the assignee hereof and is expressly incorporated herein by reference in its entirety.

BACKGROUND

I. Field of the Disclosure

Aspects of the disclosure relate generally to the management of multiple processor cores, and specifically to the optimization of prefetcher configurations in a many-core system.

II. Background

Cloud data centers are memory, storage, and processing resources that are available to a consumer/customer via the Internet or another type of network. Many-core SoCs provide economies of scale to cloud data centers due to the fact that many-core SoCs can support large numbers of processes or processor threads in a compact and power-efficient package. The term "node" generally refers to a collection of such resources, and as used herein, the term "node" may refer specifically to one SoC or to a cluster of SoCs. Thus, a cloud data center typically has multiple nodes, which may be co-located together in one facility, distributed across disparate facilities (which themselves may or may not be geospatially diverse), or a combination of the above.

Hardware data prefetching can reduce memory latency and significantly improve the performance of many applications, provided it accurately and promptly detects their memory access patterns. However, individual prefetchers typically target specific or limited sets of patterns. To address this limitation, computer architects have designed processors that provide multiple prefetcher components running simultaneously, thus covering a wider range of access patterns than monolithic prefetchers. Despite this improvement, increasing the number of prefetches in the system can lead to contention and pollution of shared resources like memory bandwidth and cache space. Furthermore, in many-core systems, enabling prefetching can sometimes hurt performance depending on the workload.

Conventional processors offer users the ability to adjust prefetcher components through registers, but determining when to enable or disable prefetcher components for any program application is a challenging task, and conventional systems typically allow prefetcher configuration (e.g., enabling or disabling specific prefetcher components) only at boot time.

Accordingly, there is a need for techniques for runtime adaptive prefetching in a many-core system.

SUMMARY

The following presents a simplified summary relating to one or more aspects disclosed herein. Thus, the following summary should not be considered an extensive overview relating to all contemplated aspects, nor should the following summary be considered to identify key or critical elements relating to all contemplated aspects or to delineate the scope associated with any particular aspect. Accordingly, the following summary has the sole purpose to present certain concepts relating to one or more aspects relating to the mechanisms disclosed herein in a simplified form to precede the detailed description presented below.

In an aspect, a method for runtime adaptive prefetching in a many-core system comprises periodically performing the following steps: determining, for a first processor core in a many-core system, a workload classification based on at least one performance indicator of the first processor core; determining a first prefetching configuration from a plurality of prefetching configurations based on the workload classification; and configuring at least the first processor core according to the first prefetching configuration.

In an aspect, an apparatus for runtime adaptive prefetching in a many-core system comprises a plurality of processor cores, control circuitry for performing a control function, and a mesh interconnect communicatively coupled to the plurality of processor cores and the control circuitry. The control circuitry is configured to periodically perform the following steps: determine, for a first processor core in a many-core system, a workload classification based on at least one performance indicator of the first processor core; determine a first prefetching configuration from a plurality of prefetching configurations based on the workload classification; and configure at least the first processor core according to the first prefetching configuration.

Other objects and advantages associated with the aspects disclosed herein will be apparent to those skilled in the art based on the accompanying drawings and detailed description.

BRIEF DESCRIPTION OF THE DRAWINGS

The accompanying drawings are presented to aid in the description of various aspects of the disclosure and are provided solely for illustration of the aspects and not limitation thereof.

FIG. 5 is a flowchart of an example process associated with runtime adaptive prefetching in a many-core system, according to aspects of the disclosure.

DETAILED DESCRIPTION OF THE DRAWINGS

Disclosed are techniques for runtime adaptive prefetching in a many-core system. In an aspect, a method for runtime adaptive prefetching in a many-core system may include periodically performing the following steps: determining, for a first processor core in a many-core system, a workload classification based on at least one performance indicator of the first processor core; determining a first prefetching configuration from a plurality of prefetching configurations based on the workload classification; and configuring at least the first processor core according to the first prefetching configuration. The adaptive prefetching solutions presented herein can be implemented in existing runtime management systems and can be further optimized for deployment on the hardware of future processor designs.

Conventional processors may include multiple prefetcher components, each performing a particular prefetch methodology and/or targeting a particular application behavior, and may offer a mechanism by which the user may adjust (including enabling or disabling) prefetcher components through registers. However, determining when to enable or disable prefetcher components for any program application is a challenging task, in part because there may be non-linear performance behavior based on which combinations of prefetchers are enabled, since there is a tradeoff between accurate prefetches to improve latency and useless prefetches that clog up memory bandwidth. In a many-core (e.g., 40+ individual cores) environment, this becomes a first-order effect. The best prefetcher configuration may depend on the workload (e.g., the specific program or application) and its runtime characteristics (e.g., whether the code being executed at a particular instant is memory-intensive or processor-intensive). Thus, what is needed is runtime adaptive prefetching in a many-core system.

Accordingly, methods and systems for runtime adaptive prefetching in a many-core system are herein presented. In some aspects, a system for runtime adaptive prefetching includes a well-trained machine learning (ML) model that can dynamically determine an optimal prefetching configuration based on analysis of current workload behaviors. The optimal prefetching configuration is then applied to the prefetcher(s) during runtime. In some aspects, these steps are periodically performed during runtime so that the prefetching configuration can be modified in response to a change in workload characteristics across relatively short time intervals.

Figure 1:
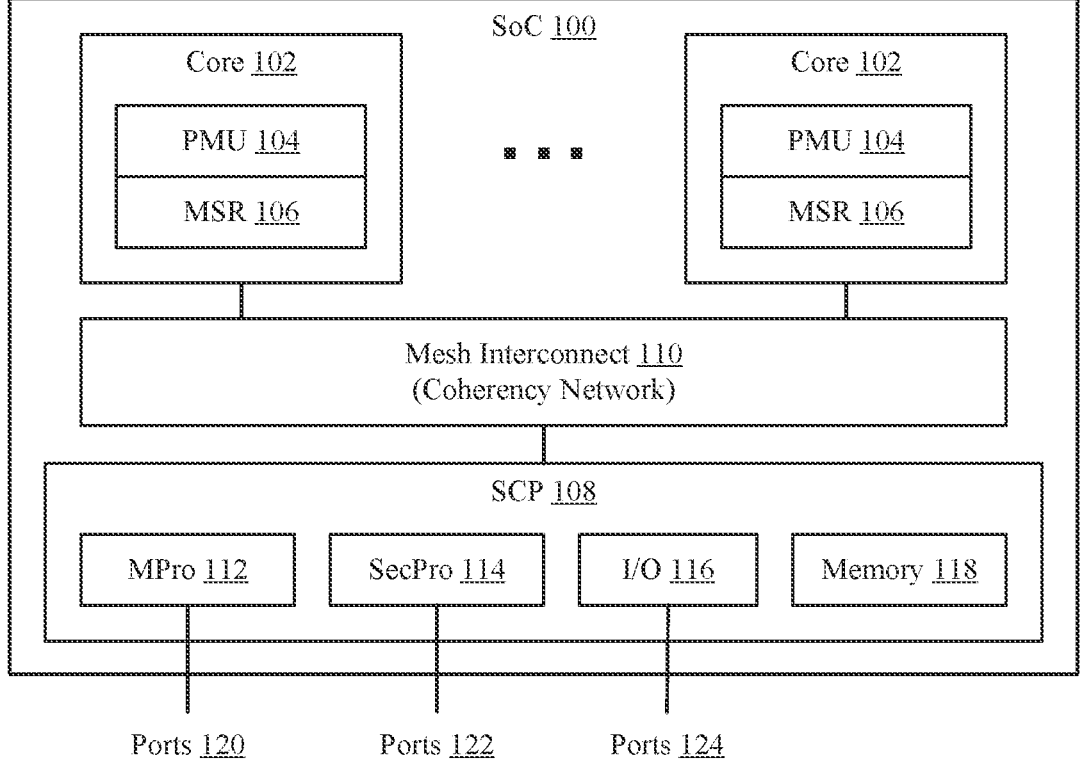
FIG. 1 is a diagram of a many-core system on a chip (SoC) that supports runtime adaptive prefetching, according to aspects of the disclosure.

FIG. 1 is a diagram of a many-core system on a chip (SoC) 100 that supports runtime adaptive prefetching, according to aspects of the disclosure. The SoC 100 illustrated in FIG. 1 includes a set of processing cores 102 (or simply "cores" 102). In the example illustrated in FIG. 1, each core 102 includes a performance monitoring unit (PMU) 104 and at least one model-specific register (MSR) 106. A PMU 104 may comprise several programmable registers that can be used to monitor micro-architectural information. Example events that a PMU 104 may track include, but are not limited to, the number of instructions, number of cycles, the number of memory accesses, the number of branch misses, and the number of cache misses. These numbers can be used to calculate features such as instructions per cycle (IPC), the number of memory accesses per 1 k instructions, the number of branch misses per 1 k instructions, the number of cache misses per 1 k instructions, the ratio of cache misses to memory accesses, the ratio of L2 data cache refills to cache misses, and the ratio of L2 instruction cache refills to branch misses. A MSR 106 may comprise several programmable registers that can be used to control the behavior of one or more components of a core 102, including enabling or disabling each of a plurality of prefetcher modes of operation, which may include activating or deactivating each of a plurality of prefetcher circuits.

The SoC 100 also includes a system control processor (SCP) 108 that handles many of the system management functions of the SoC 100. The cores 102 are connected to the SCP 108 via a mesh interconnect 110 that forms a high-speed bus that couples each of core 102 to the other cores 102 and to other on chip and off-chip resources, including higher levels of memory (e.g., a level three (L3) cache, dual data rate (DDR) memory), peripheral component interconnect express (PCIe) interfaces, and/or other resources.

The SCP 108 may include a variety of system management functions, which may be divided across multiple functional blocks or which may be contained in a single functional block. In the example illustrated in FIG. 1, the system management functions of the SCP 108 are divided over a management processor (MPro) 112 and a security processor (SecPro) 114 coupled to other components of the SoC 100 by the mesh interconnect 110. The SoC 100, the MPro 112, and the SecPro 114 may each include joint test action group (JTAG) ports and firmware, which may be connected to other components within the SoC 100 via the mesh interconnect 110, an inter-integrated circuit (I2C) interface, or other connection. In the example illustrated in FIG. 1, the SCP 108 further includes an input/output (I/O) block 116 and an on-board shared memory 118 also coupled to other components of the SoC 100 by the mesh interconnect 110. Note that although FIG. 1 illustrates the MPro 112 and the SecPro 114 as separate microcontrollers (or processors), as will be appreciated, they may be combined into one or two microcontrollers, or sub-divided into more than two microcontrollers.

The MPro 112 and the SecPro 114 may include a bootstrap controller and an I2C controller or other bus controller. The MPro 112 and the SecPro 114 may communicate with on-chip sensors, an off-chip baseboard management controller (BMC), and/or other external systems to provide control signals to external systems. The MPro 112 and the SecPro 114 may connect to one or more off-chip systems as well via ports 120 and ports 122, respectively, and/or may connect to off-chip systems via the I/O block 116, e.g., via ports 124.

The MPro 112 performs error handling and crash recovery for the cores 102 of the SoC 100 and performs power failure detection, recovery, and other fail safes for the SoC 100. The MPro 112 performs the power management for the SoC 100 and may connect to one or more voltage regulators (VR) that provide power to the SoC 100. The MPro 112 may receive voltage readings, power readings, and/or thermal readings and may generate control signals (e.g., dynamic voltage and frequency scaling (DVFS)) to be sent to the voltage regulators. The MPro 112 may also report power conditions and throttling to an operating system (OS) or hypervisor running on the SoC 100. The MPro 112 may provide the power for boot up and may have specific power throttling and specific power connections for boot power to the SCP 108 and/or the SecPro 114. The MPro 112 may receive power or control signals, voltage ramp signals, and other power control from other components of the SCP 108, such as the SecPro 114, during boot up as hardware and firmware become activated on the SoC 100. These power-up processes and power sequencing may be automatic or may be linked to events occurring at or detected by the MPro 112 and/or the SecPro 114. The MPro 112 may connect to the shared memory 118, the SecPro 114, and external systems (e.g., VRs) via ports 120, and may supply power to each via power lines.

The SecPro 114 manages the boot process and may include on-board read-only memory (ROM) or erasable programmable ROM (EPROM) for safely storing firmware for controlling and performing the boot process. The SecPro 114 also performs security sensitive operations and only runs authenticated firmware. More specifically, the components of the SoC 100 may be divided into trusted components and non-trusted components, where the trusted components may be verified by certificates in the case of software and firmware components, or may be pure hardware components, so that at boot time, the SecPro 114 may ensure that the boot process is secure.

The shared memory 118 may be on-board random-access memory (RAM) or secured RAM that can be trusted by the SecPro 114 after an integrity check or certificate check. The I/O block 116 may connect over ports 124 to external systems and memory (not shown) and connect to the shared memory 118. The SCP 108 may use the I/O connections of the I/O block 116 to interface with a BMC or other management system(s) for the SoC 100 and/or to the network of the cloud platform (e.g., via gigabit ethernet, PCIe, or fiber). The SCP 108 may perform scaling, balancing, throttling, and other control processes to manage the cores 102, associated memory controllers, and mesh interconnect 110 of the SoC 100.

In some aspects, the mesh interconnect 110 is part of a coherency network. There are points of coherency somewhere in the mesh network depending on the address and target memory. A coherency network typically includes control registers, status registers, and state machines, and in the example illustrated in FIG. 1, these are initialized by the MPro 112, e.g., based on system and memory configuration, and the MPro 112 monitors the coherency domain for errors.

Figure 2:
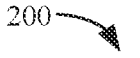
FIG. 2 illustrates a method for runtime adaptive prefetching in a many-core system, according to aspects of the disclosure.

FIG. 2 illustrates a method 200 for runtime adaptive prefetching in a many-core system, according to aspects of the disclosure. FIG. 2 illustrates an example interaction between a many-core SoC, such as the SoC 100 in FIG. 1, a firmware (FW) layer 202, an operating system (OS) layer 204, and an application (APP) layer 206.

In the example shown in FIG. 2, the FW layer 202 includes a FW interface 208, by which the OS 204 may access the MSR(s) 106 of the core(s) 102.

In the example shown in FIG. 2, the OS layer 204 includes a performance monitoring operating system call, shown in FIG. 2 as perf syscall 210, by which an application in the APP layer 206 can access the PMU(s) 104 of the core(s) 102. The OS layer 204 also includes an MSR interface 212, by which an application in the APP layer 206 can access the MSR(s) 106, via the FW interface 208.

In the example shown in FIG. 2, the APP layer 206 includes a prefetcher configuration application 214 that periodically performs the following steps for at least one core 102: reading at least one value from a PMU 104 (block 216) and providing the PMU value(s) to a trained machine language (ML) model 218, which produces a prefetcher configuration (block 220). In some aspects, the prefetcher configuration may be a one-hot encoded vector, where each element of the vector indicates whether the prefetcher should be enabled or disabled. In some aspects, the prefetcher configuration may be a bitfield, where each bit indicates whether a particular prefetcher should be enabled or disable. The prefetcher configuration is then applied to the MSR 106 of the core 102. In the example shown in FIG. 2, the PMU(s) are read using the perf syscall 210. In the example shown in FIG. 2, the prefetcher configuration is provided to the core 102 via the MSR interface 212 and the FW interface 208.

In some aspects, the ML model 218 may comprise a decision tree or other type of algorithm that shows a pathway or hierarchical structure to a decision or an output. A decision tree may be used for both classification and regression tasks, and for decision making. It consists of a root node, branches, and leaf nodes, which display the possible choices and outcomes based on a series of problems or inputs. In some aspects, a single decision tree is trained. In some aspects, multiple decision trees are trained. In some aspects, other data mining algorithms that are commonly used in classification and supervised learning may be used instead of a decision tree. Examples of such algorithms include but are not limited to: Hoeffding trees (streaming data algorithm); random forests (multi decision tree plus voting to reduce overfitting); a perceptron (single level neural network, easy to build in hardware); Vowpal's wabbit; contextual bandits; parametric naïve Bayes classification (NBC); neighborhood components analysis (NCA); multinomial logistic regression; and support vector machines (SVM). Like decision trees, these can also be embodied in hardware.

It is noted that the division of labor between the hardware, firmware, operating system, and application shown in FIG. 2 is illustrative and not limiting. For example, some of the steps performed at the APP layer 206 may be instead performed by the OS 204, the firmware 202, or even the SoC 100 itself, without departing from the scope of the invention.

Figure 3:
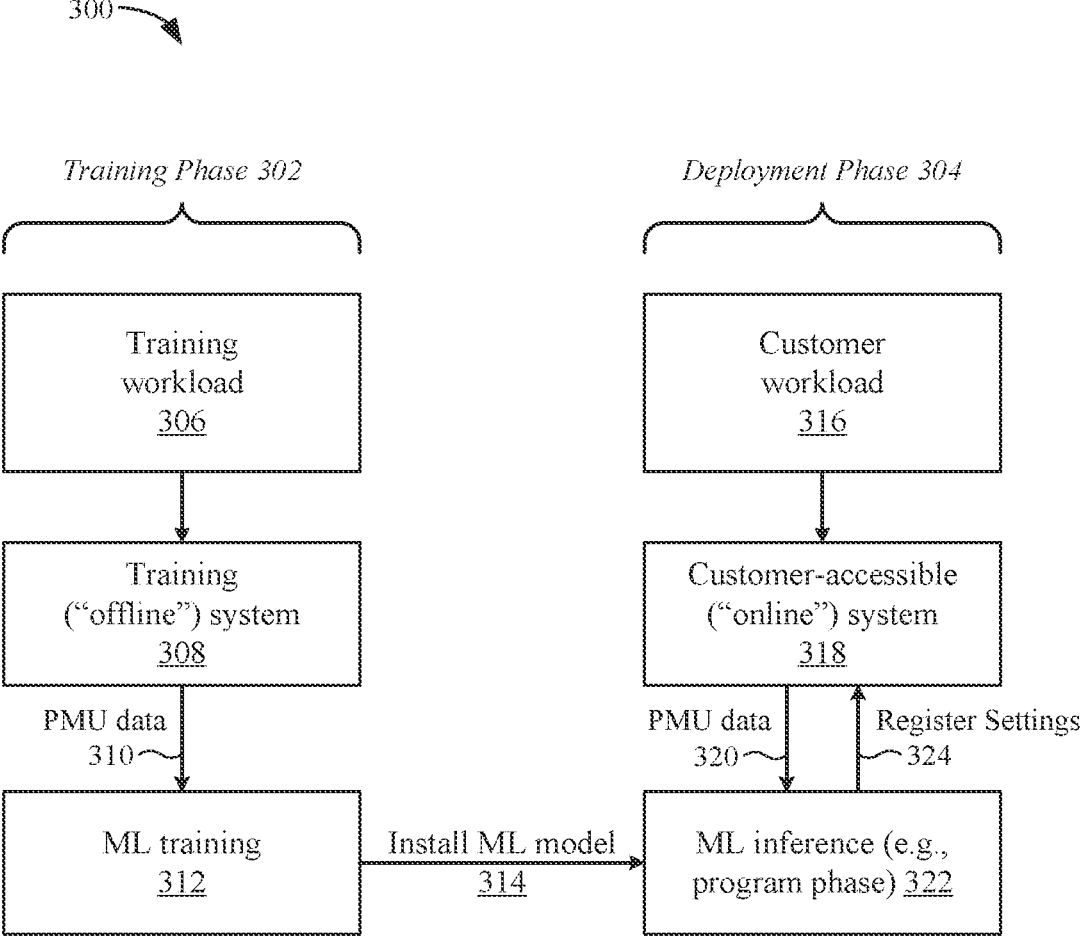
FIG. 3 is a flow chart illustrating a process for runtime adaptive prefetching in a many-core system, according to aspects of the disclosure.

FIG. 3 is a flow chart illustrating a process 300 for runtime adaptive prefetching in a many-core system, according to aspects of the disclosure. In the example shown in FIG. 3, process 300 includes a training phase 302 followed by a deployment phase 304. In the example shown in FIG. 3, the training phase 302 comprises providing a training workload 306 to a training ("offline") system 308 and using PMU data 310 that is collected periodically during execution of the training workload 306 for ML training 312. The frequency at which the PMU data 310 is collected and analyzed by an ML model, such as the ML model 218 in FIG. 2—an operation that may be referred to herein as "phase detection"—may be adjusted as well. In one implementation, for example, a frequency for phase detection was set to 100 milliseconds, based on context switch times in modern operating systems. As used herein, the 100 ms period is also referred to as the "epoch."

During training, performance data may be collected at a fine granularity for training purposes, e.g., at a finer granularity than may ultimately be necessary for runtime operation. That data is used to train the ML model, which may include identifying the "phases" of program behavior, where a "phase" is a pattern of operation, which may be from the viewpoint of memory access. In some aspects, a defined phase may be identified based on PMU values. In some aspects, each phase may be associated with a specific prefetcher configuration.

In some aspects, specific workload sets are selected for training, e.g., to ensure that a wide range of potential customer workloads are considered during ML training 312, to fine tune the ML model to specific workloads that a customer is likely to run, or a combination thereof. After the ML has been trained, the ML is installed (block 314). In some aspects, the trained ML model is installed onto the firmware of the target system, which is then put into operation.

In the example shown in FIG. 3, the deployment phase 304 comprises providing a customer workload 316 to a customer-accessible ("online") system 318 in which the trained ML model has been installed. PMU data 320 collected during execution of the customer workload 316 are provided to the ML model operating in inference mode 322, and the ML model provides prefetcher configuration register settings 324 to the customer-accessible system 318. In some aspects, the customer-accessible system 318 periodically queries the ML model to notify the customer-accessible system 318 which prefetcher configuration to use based on the current phase of program behavior identified in real time. Examples of register settings that can be changed may include, but are not limited to: the mix of prefetchers that are activated or deactivated; the mix of cores to which the prefetcher configuration is to be applied; the periodicity of the phase detection; and so on.

In some aspects, the prefetcher configuration selected or output by the ML model may be applied only to the particular core which provided the PMU data. In these implementations, each processor core may have its own independent prefetcher configuration. In some aspects, the prefetcher configuration selected or output by the ML model may be presumed to apply to all processor cores in the many-core system. In some aspects, one subset of processor cores in the many-core system may have a prefetcher configuration that is different from other processor cores, or other subsets of processor cores, in the many-core system. In some aspects, the PMU data used by the ML model to select or output a prefetcher configuration may represent performance data across all processor cores in the many-core system.

Figure 4:
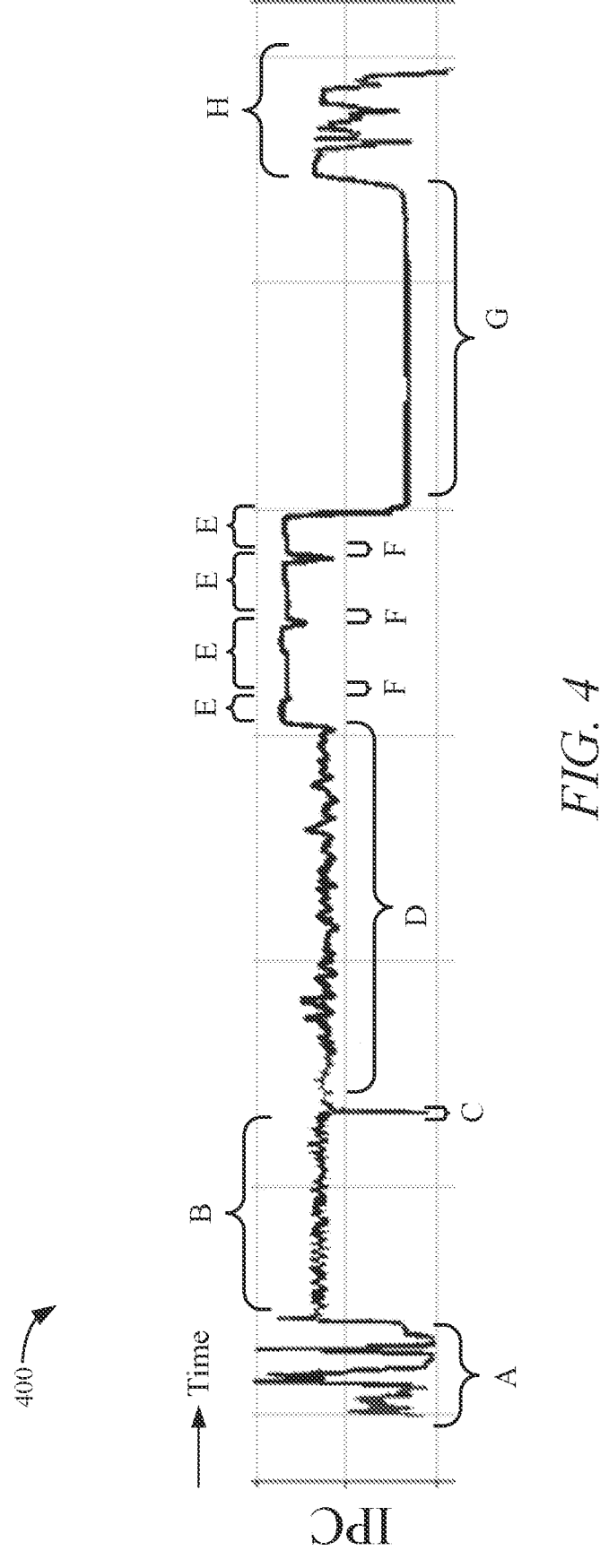
FIG. 4 is a graph illustrating the concept of "phase" as applied to program behavior, according to aspects of the disclosure.

FIG. 4 is a graph 400 illustrating the concept of "phase" as applied to program behavior, according to aspects of the disclosure. FIG. 4 shows a graph of instructions per cycle (IPC) over time during execution of an example workload. In the example illustrated in FIG. 4, several different "phases" are identified, labeled "A" through "H" on the graph. In the example illustrated in FIG. 4, phase A may be an initialization phase that is a mix of instruction and data caching, memory access, device configuration, and other startup tasks associated with a program. Phase B may represent main loop processing, with a fairly steady number of instructions executed per cycle. Phase C may represent a period during which the program may have been interrupted by another program or another core, for example. Phase D may represent some kind of long calculation that involves occasional memory access. Phase E may represent a processor-intensive operation that is interspersed with I/O-intensive phases F. Phase G may represent another memory-intensive phase, and phase H may represent miscellaneous actions taken in preparation for program termination.

It will be understood that the example phases and respective descriptions are illustrative, and that metrics other than IPC, or combinations of metrics that may include IPC, may be used to identify or distinguish different phases. During training of the ML model 218, each defined phase may be found to benefit from a particular prefetcher configuration. Thus, in some aspects, the ML model may determine the phase (e.g., one of A-H) that most closely represents the current behavior of the core, based on the most recent PMU data, and output a register setting that configures the prefetchers to the prefetcher configuration that is best for that phase.

During offline classification, for example, in some aspects, different performance monitoring counters may be used to identify workload phases, to see which counter or combination of counters best identifies (or distinguishes between) workload phases. For example, in one implementation, it was determined that good phase delineation was achieved using only counters that indicate cache hit/miss events, counters that indicate prefetch launch events, and counters that indicate IPC. While other counters, such as counters for branch misprediction, TLB miss, store-to-load forwarding mispredicts, and program EL changes could be used instead of (or in addition to) the first set of counters described above, it was determined that the addition of those counters did not provide a benefit that justified the additional complexity, time, or cost. For example, many counters may not show any correlation to changing the prefetcher type and so it would be a waste to consider those counters during phase classification.

Alternatives to hardware counters include sampling instruction pointers (IP) or tracking instruction types. In some aspects, similar IPs can be clustered together into phases. Yet another metric is to track instructions, i.e., to count the number of certain types of instructions executed in an epoch and to use the counts per instruction type as signatures, where similar signatures are grouped together into a single phase.

During online detection, on the other hand, phase detection tends to be limited by the number of hardware counters available on the system. For example, in one implementation, three programmable hardware counters (branch misses, cache misses, and memory accesses) are used. There is a tradeoff between using more counters, which may improve phase detection accuracy but reduce counters available for use by any other processes, and using less counters, which provides more counters for other processes but may result in less accurate phase detection.

There are some workloads which may bounce back and forth between different prefetcher configurations at high frequency, sometimes at every epoch. Thus, in some aspects, it may be useful to allow for some amount of hysteresis in the runtime adaptive prefetcher process. For example, in some aspects, a prefetcher configuration may be changed only if the ML model recommends the same configuration—different from the current configuration—for some number (e.g., 2 or 3) of epochs in a row. It is understood that the same epoch length should be used for both offline training and online classification.

As a general case, there are a number of performance metrics that may be used as inputs to a machine learning model. A PMU 104 is typically a set of hardware registers that keep track of how many times a specific type of event occurs during a given timeframe. As such, a PMU 104 typically consumes one of a limited number of hardware counters on the core 102 for each type of event that is being monitored. For a specific implementation of runtime adaptive prefetching, it may be that only certain types of events are useful to differentiate between program behaviors sufficiently enough to determine that a change to a current prefetcher configuration is warranted. Thus, in some aspects, there may be a process to determine which types of PMU data should be provided to the ML model and which should not, with the goal to determine the minimum number of PMU registers or hardware counters necessary for this purpose, in order to not consume more of them than needed so that they are available for other uses. For example, in one implementation, a PMU 104 has ten counters, and it was determined that just three types of PMU data were sufficient to properly identify the current program phase and adjust the prefetcher configuration accordingly (e.g., by indexing into the decision tree model).

Likewise, as a general case, there may be many different prefetcher configurations available in hardware. An exemplary core may have four different prefetchers in the level 2 cache (L2C) subsystem: a best offset prefetcher (BOP), which is aggressive and accurate; a second-best offset prefetcher (SBOP), which requires the BOP to also be active; a spatial prefetcher (SPP), which performs adjacent (i.e., odd or even) sector prefetch; and a next line prefetcher (NLP). Because the SBOP requires the BOP to also be active, but otherwise each prefetcher may be activated or deactivated independently, there are twelve possible combinations, including all prefetchers being off. For a specific implementation, it may be determined that only some of those twelve possible combinations are sufficiently effective to justify a reconfiguration during runtime. For example, in one implementation, it was determined that only five prefetcher configurations were needed—namely, BOP+SPP, BOP+SBOP, SPP+NLP, all ON, and all OFF. Thus, in some aspects, there may be a process to determine which of the possible prefetcher configurations should be recommended by the ML model and which should not, with the goal to reduce the complexity of the decision process by limiting the number of possible outcomes that must be evaluated.

Also, as a general case, there are a number of possible ways to characterize the behavior of a process based on the PMU(s) values. For example, a process may be characterized as memory intensive if the memory accesses metric exceeds a threshold, or as process intensive if the IPC value exceeds another threshold, and so on. Thus, for a specific implementation, there may be a process to determine how best to characterize behavior of processes running on a core 102.

In one implementation, for example, it was determined that an optimal result was achieved when only a single decision tree was used rather than multiple decision trees and when only five of the twelve possible prefetcher configurations were considered as target outputs by the ML model 218. In one implementation, for example, a frequency for phase detection was set to 100 milliseconds, based on context switch times in modern operating systems.

It will be understood that the example above is also illustrative and not limiting. For other systems, which may have different hardware and which may have different customer workloads, a different set of design decisions may provide the optimal result. For example, in some aspects, a kernel module coordinates the interaction with the trained ML module, but in alternative aspects, the trained ML module may be accessed via a sideband firmware interface. In some aspects, runtime adaptive prefetching may be an optional feature, e.g., enabled or disabled through BIOS controls.

It will also be understood that the techniques for determining an optimal prefetcher configuration may also be applied to optimize the performance of other behaviors that are controllable by register settings that can be changed from outside of the system. Examples of other configurations that could benefit from phase detection and analysis by a trained ML model to improve performance include but are not limited to: allocating all fill buffers for possible prefetches, or only allocating some fill buffers for prefetches and sequestering and dedicating the rest for demand accesses; enabling or disabling a processor core's code prefetcher; and enabling "near atomics" versus "far atomics" for synchronization primitives and lock elision. Examples for saving power include but are not limited to: changing memory control page-open and page-closed policies, for determining how long to keep pages open; activating or deactivating a core's ability to reduce the instruction decode width, to provide opportunity to shut off some portion of the out-of-order subsystem; activating or deactivating a processor core's ability to disable half of the floating-point hardware when there are very few floating-point instructions seen in recent code; and activating or deactivating adaptive 2-wide decoding. Like prefetcher configurations, these configuration changes can also be made by a ML model, based on the current program or workload phase or other metrics.

Implementation Examples

In some aspects, a runtime prefetcher selection approach uses a low-overhead machine learning model to enable or disable prefetcher components based on their expected performance improvement on a state-of-the-art NoC platform. The approach includes collecting hardware counter data to monitor the system workload and using phase classification and supervised learning to correlate workload behaviors with the best selection of prefetcher components. A software-based version of the approach was deployed on a state-of-the-art cloud-scale hardware platform but could also be implemented in hardware. This approach can improve the performance of both seen workloads (i.e., those used to train the ML model) and unseen workloads (i.e., those not included in the ML training set) by 2% on average.

The implemented approach includes using phase classification to group similar workload behaviors and find the best prefetcher selection for each behavior, and implementing a decision tree model that is light-weight yet accurate enough to improve the execution time of cloud workloads running on a state-of-the-art many-core NoC platform. The approach was evaluated with data collected from diverse multi-programmed and multi-threaded workloads, and demonstrated the ability to generalize and improve the performance of workloads that were not seen during training.

One advantage of ML-based solutions is that they do not need to execute and rank all possible prefetcher configurations during runtime, which improves scalability. Additionally, eliminating online exploration yields the opportunity for better performance optimization results. However, this is not the case in many-core systems, where it is sometimes beneficial to disable all prefetchers for some workloads. The implemented approach uses a model that requires storing only 15 parameters and performs up to four arithmetic operations to select a prefetcher configuration.

One goal of a prefetcher selection policy is to minimize the execution time of a workload. as evidenced by a trace of hardware counters that track different types of events, such as instruction counts, memory accesses, cache hits and misses, etc. The hardware counter values are transformed into features, such as IPC, ratio of cache hits to cache misses, and so on. The approach further partitioned the goal of minimizing the execution time into smaller goals that maximize the IPC, based on the observation that the average IPC is inversely proportional to the execution time. In the implemented approach, at each time step (e.g., an epoch), the trained ML model produced an output that predicted which prefetcher or combination of prefetchers would produce the maximum IPC.

Offline analysis was used to train the ML model. In the implemented approach, this involved data collection, clustering, phase classification, data set generation, and model training. Each of these are described in turn below.

Data Collection: The approach included collecting execution metrics data from SPEC CPU Int Rate 2017, a multi-programmed benchmark suite with 10 different workloads. The metrics were measured using performance monitoring units (PMUs), also known as hardware counters. The workloads ran on a state-of-the-art, cloud-scale, many-core NoC platform with Fedora Linux 36. The platform had 12 different prefetcher configurations. For each prefetcher configuration, the approach included collecting one trace of hardware counters per workload, resulting in a total of 120 traces (12 prefetcher options times 10 workloads). Each trace consisted of seven hardware counters collected periodically every 100 ms with Linux's perf tool. The hardware counters were transformed into seven features, shown in the table below:

TABLE 1

| Lists of collected hardware counters and features. | |
| --- | --- |
| Hardware counters | Features |
| Instructions | Instructions per cycle (IPC) |
| Memory accesses | Memory accesses per kilo instructions |
| Branch misses | Branch misses per kilo instructions |
| Cache misses | Cache misses per kilo instructions |
| CPU cycles | Cache misses to memory accesses ratio |
| L2 data cache refills | L2 data cache refills to cache miss ratio |
| L2 instruction cache refills | L2 instruction cache refills to branch misses ratio |

Clustering: In order to compare the samples of different prefetcher configurations, the approach included clustering similar PMU behaviors together to find phases within the workloads. The approach included comparing phase performance across traces of the same workload. The approach included training a clustering model with data from only one prefetcher configuration. The configuration of "all prefetchers OFF" was chosen as the baseline since it shows workload behaviors without the effects of prefetching. The approach included scaling all features to a range between 0 and 1 using a min-max scaler and clustering all the workload traces of the baseline configuration using k-means. This produced a table of cluster centers, which was then used for phase classification.

Phase Classification: Once the cluster centers have been generated using data from one prefetcher configuration, they are then used to classify the phases of data samples in all traces. Next, all samples in the same phase and prefetcher configuration were grouped and IPC was calculated. Using this calculation, a table of average IPC values was generated, where the table index corresponded to phase labels and the columns corresponded to different prefetcher configurations. This allowed the performance of different prefetcher configurations across workload phases to be compared to each other.

Data Set Generation: The table containing average IPC values was used to select the prefetcher configuration that yielded the highest IPC per phase. This selection was considered to be the ground truth for the purpose of training the ML model. The approach can then associate each sample and its phase classification with the best prefetcher configuration, generating a dataset that associates each sample's features to the ground truth prefetcher selection.

Model Training: In the approach, each phase is represented by seven features. To select the best prefetcher using the average IPC table, one approach included measuring the Euclidean distance between a new sample and each phase in the table to find the closest phase. However, the current approach includes training a lightweight ML model—e.g., a decision tree—that learns the table and requires fewer operations to produce an output. After training the decision tree, it was determined that only four input features were needed (instead of seven) while maintaining high prediction accuracy, which reduces the number of features collected during runtime. Additionally, the largest decision tree model had a depth of four, which only needs to store at most 15 tree nodes and perform at most four operations during inference.

For the online implementation, the prefetcher selection model was implemented as a program with a thread that was invoked every 100 ms (i.e., 1 epoch=100 ms). In the implemented approach, this thread accessed hardware counter values using the perf system call, then transformed the counters into features and performed inference on the decision tree. Finally, it wrote the decision tree output to the corresponding model-specific register (MSR).

The implemented approach was evaluated on new executions of SPEC CPU 2017 Integer Rate workloads as well as completely new workloads not used during training. This evaluation included workloads from the DaCapo and Renaissance multi-threaded Java benchmark suites. On average, enabling system-wide runtime adaptive prefetching improved performance by 2% and up to 5% in the best-case scenario for the evaluated systems. The implemented approach was further evaluated while executing binaries created with a newer compiler than the compiler used to create the ML model, and a similar performance improvement was observed.

FIG. 5 is a flowchart of an example process 500 associated with runtime adaptive prefetching in a many-core system, according to aspects of the disclosure. In some implementations, one or more process blocks of FIG. 5 may be performed by one or more components of an SoC, such as processor(s), memory, or other circuitry, any or all of which may be means for performing the operations of process 500. For example, in some aspects, one or more process blocks of FIG. 5 may be performed by control circuitry for an SoC (e.g., SoC 100), such as the MPro 112. As shown in FIG. 5, process 500 may include periodically performing a prefetch configuration operation during runtime, where the prefetch configuration operation comprises the following steps.

Process 500 may include, at block 510, determining, for a first processor core in a many-core system, a workload classification based on at least one performance indicator of the first processor core. In some aspects, determining the workload classification based on at least one performance indicator of the first processor core comprises determining the workload classification based on at least one hardware counter value. In some aspects, determining the workload classification based on at least one performance indicator of the first processor core comprises determining the workload classification based on at least one of a count of instructions per cycle (IPC), a count of memory accesses, a count of branch hits or misses, a count of translation look-aside buffer (TLB) hits or misses, a count of cache hits or misses, a ratio of cache misses to memory accesses, a ratio of L2 data cache refills to cache misses, or a ratio of L2 instruction cache refills to branch misses. In some aspects, determining the workload classification based on at least one performance indicator of the first processor core and determining the first prefetching configuration from the plurality of prefetching configurations based on the workload classification comprises providing at least one performance indicator to a trained machine learning (ML) model instantiated in hardware, a firmware layer, an operating system layer, an application layer, or a combination thereof, and receiving, from the ML model, the determined first prefetching configuration. In some aspects, the ML model comprises a decision tree, a neural network, a Vowpal's wabbit, a contextual bandit, a Bayes classifier, a linear classifier, a component analyzer, a transformer, or a combination thereof. In some aspects, process 500 includes training the ML model prior to its use.

Process 500 may further include, at block 520, determining a first prefetching configuration from a plurality of prefetching configurations based on the workload classification.

Process 500 may further include, at block 530, configuring at least the first processor core according to the first prefetching configuration. In some aspects, configuring at least the first processor core according to the first prefetching configuration comprises writing register settings to at least one control register of the first processor core. In some aspects, configuring at least the first processor core according to the first prefetching configuration comprises writing register settings to at least one control register of at least one other processor core in the many-core system.

Process 500 may include additional implementations, such as any single implementation or any combination of implementations described below and/or in connection with one or more other processes described elsewhere herein. In some aspects, the prefetch configuration operation may be periodically performed for at least one other processor core, or all of the processor cores, in the many-core system. Although FIG. 5 shows example blocks of process 500, in some implementations, process 500 may include additional blocks, fewer blocks, different blocks, or differently arranged blocks than those depicted in FIG. 5. Additionally, or alternatively, two or more of the blocks of process 500 may be performed in parallel.

Runtime adaptive prefetching in a many-core system provides a number of technical advantages, including but not limited to the following. Runtime adaptive prefetching can be performed in response to ever-changing workload conditions and may be performed as often or as rarely as needed. This obviates the need for the customer to know which prefetcher configuration to use for the target customer workload. A ML model can be trained to determine the best prefetching configuration from all or a subset of possible prefetching configurations, using all or some minimum subset of performance indicators, and this training can be done once offline (i.e., in a training system), after which the trained ML model can be instantiated wherever and whenever needed and used online (i.e., in a customer-accessible system). Moreover, the operation of the runtime adaptive prefetching algorithm may be controlled or modified by the customer, including disabling runtime adaptive prefetching entirely, e.g., via a BIOS setting. The techniques disclosed herein have been proven to increase performance of a many-core processor and may also be applied to other aspects of the operation of a many-core system to provide other benefits, such as reducing power consumption.

It is also noted that the operational steps described in any of the exemplary aspects herein are described to provide examples and discussion. The operations described may be performed in numerous different sequences other than the illustrated sequences. Furthermore, operations described in a single operational step may actually be performed in a number of different steps. Additionally, one or more operational steps discussed in the exemplary aspects may be combined. It is to be understood that the operational steps illustrated in the flowchart diagrams may be subject to numerous different modifications as will be readily apparent to one of skill in the art. Those of skill in the art will also understand that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

The previous description of the disclosure is provided to enable any person skilled in the art to make or use the disclosure. Various modifications to the disclosure will be readily apparent to those skilled in the art, and the generic principles defined herein may be applied to other variations.

Thus, the disclosure is not intended to be limited to the examples and designs described herein but is to be accorded the widest scope consistent with the principles and novel features disclosed herein.

Those of skill in the art will appreciate that information and signals may be represented using any of a variety of different technologies and techniques. For example, data, instructions, commands, information, signals, bits, symbols, and chips that may be referenced throughout the above description may be represented by voltages, currents, electromagnetic waves, magnetic fields or particles, optical fields or particles, or any combination thereof.

Those of skill in the art will further appreciate that the various illustrative logical blocks, components, agents, IPs, modules, circuits, and algorithms described in connection with the aspects disclosed herein may be implemented as electronic hardware, instructions stored in memory or in another computer readable medium and executed by a processor or other processing device, or combinations of both. Memory disclosed herein may be any type and size of memory and may be configured to store any type of information desired. To clearly illustrate this interchangeability, various illustrative components, blocks, modules, circuits, and steps have been described above generally in terms of their functionality. How such functionality is implemented depends upon the particular application, design choices, and/or design constraints imposed on the overall system. Skilled artisans may implement the described functionality in varying ways for each particular application, but such implementation decisions should not be interpreted as causing a departure from the scope of the present disclosure.

The various illustrative logical blocks, processors, controllers, components, agents, IPs, modules, and circuits described in connection with the aspects disclosed herein may be implemented or performed with a processor, a Digital Signal Processor (DSP), an Application Specific Integrated Circuit (ASIC), a Field Programmable Gate Array (FPGA) or other programmable logic device, discrete gate or transistor logic, discrete hardware components, or any combination thereof designed to perform the functions described herein. A processor may be a microprocessor, but in the alternative, the processor may be any conventional processor, controller, microcontroller, or state machine. A processor may also be implemented as a combination of computing devices (e.g., a combination of a DSP and a microprocessor, a plurality of microprocessors, one or more microprocessors in conjunction with a DSP core, or any other such configuration).

The aspects disclosed herein may be embodied in hardware and in instructions that are stored in hardware, and may reside, for example, in Random Access Memory (RAM), flash memory, Read Only Memory (ROM), Electrically Programmable ROM (EPROM), Electrically Erasable Programmable ROM (EEPROM), registers, a hard disk, a removable disk, a CD-ROM, or any other form of computer readable medium or non-transitory storage media known in the art. An exemplary storage medium is coupled to the processor such that the processor can read information from, and write information to, the storage medium. In the alternative, the storage medium may be integral to the processor. The processor and the storage medium may reside in an ASIC.

Thus, the various aspects described herein may be embodied in a number of different forms, all of which have been contemplated to be within the scope of the claimed subject matter. In addition, for each of the aspects described herein, the corresponding form of any such aspects may be described herein as, for example, "logic configured to," "instructions that when executed perform," "computer instructions to," and/or other structural components configured to perform the described action.

While the foregoing disclosure shows illustrative aspects of the disclosure, it should be noted that various changes and modifications could be made herein without departing from the scope of the disclosure as defined by the appended claims. The functions, steps and/or actions of the method claims in accordance with the aspects of the disclosure described herein need not be performed in any particular order. Furthermore, although elements of the disclosure may be described or claimed in the singular, the plural is contemplated unless limitation to the singular is explicitly stated.

What is claimed is:

1. A method for runtime adaptive prefetching in a many-core system, the method comprising:
periodically performing a prefetch configuration operation comprising:
determining, for a first processor core in a many-core system, a workload classification based on at least one performance indicator of the first processor core;
determining a prefetching configuration from a plurality of prefetching configurations based on the workload classification, wherein each prefetching configuration in the plurality of prefetching configurations specifies an enabled or disabled state for each of a plurality of prefetching algorithms; and
configuring at least the first processor core according to the prefetching configuration,
wherein each processor core in the many-core system can be configured in the plurality of prefetching configurations, wherein the plurality of prefetching configurations includes a first prefetching configuration in which none of the plurality of prefetching algorithms is active, a second prefetching configuration in which one of the plurality of prefetching algorithms is active, and a third prefetching configuration in which more than one of the plurality of prefetching algorithms is active simultaneously.

2. The method of claim 1, wherein determining the workload classification based on at least one performance indicator of the first processor core comprises determining the workload classification based on at least one hardware counter value.

3. The method of claim 1, wherein determining the workload classification based on at least one performance indicator of the first processor core comprises determining the workload classification based on at least one of:
a count of instructions per cycle (IPC);
a count of memory accesses;
a count of branch hits or misses;
a count of translation look-aside buffer (TLB) hits or misses;
a count of cache hits or misses;
a ratio of cache misses to memory accesses;
a ratio of L2 data cache refills to cache misses; or
a ratio of L2 instruction cache refills to branch misses.

4. The method of claim 1, wherein determining the workload classification based on at least one performance indicator of the first processor core and determining the prefetching configuration from the plurality of prefetching configurations based on the workload classification comprises:
providing at least one performance indicator to a trained machine learning (ML) model instantiated in hardware, a firmware layer, an operating system layer, an application layer, or a combination thereof; and
receiving, from the ML model, the determined prefetching configuration.

5. The method of claim 4, wherein the ML model comprises a decision tree, a neural network, a Vowpal's wabbit, a contextual bandit, a Bayes classifier, a linear classifier, a component analyzer, a transformer, or a combination thereof.

6. The method of claim 4, further comprising training the ML model prior to its use.

7. The method of claim 1, wherein configuring at least the first processor core according to the prefetching configuration comprises writing register settings to at least one control register of the first processor core.

8. The method of claim 7, wherein configuring at least the first processor core according to the prefetching configuration comprises writing register settings to at least one control register of at least one other processor core in the many-core system.

9. The method of claim 1, further comprising periodically performing the prefetch configuration operation for at least one other processor core in the many-core system.

10. An apparatus for runtime adaptive prefetching in a many-core system, the apparatus comprising:
a plurality of processor cores;
control circuitry for performing a control function; and
a mesh interconnect communicatively coupled to the plurality of processor cores and the control circuitry;
wherein the control circuitry is configured to periodically perform a prefetch configuration operation comprising:
determining, for a first processor core in a many-core system, a workload classification based on at least one performance indicator of the first processor core;
determining a prefetching configuration from a plurality of prefetching configurations based on the workload classification, wherein each prefetching configuration in the plurality of prefetching configurations specifies an enabled or disabled state for each of a plurality of prefetching algorithms; and
configuring at least the first processor core according to the prefetching configuration,
wherein each processor core in the many-core system can be configured in the plurality of prefetching configurations, wherein the plurality of prefetching configurations includes a first prefetching configuration in which none of the plurality of prefetching algorithms is active, a second prefetching configuration in which one of the plurality of prefetching algorithms is active, and a third prefetching configuration in which more than one of the plurality of prefetching algorithms is active simultaneously.

11. The apparatus of claim 10, wherein, to determine the workload classification based on at least one performance indicator of the first processor core, the control circuitry is configured to determine the workload classification based on at least one hardware counter value.

12. The apparatus of claim 10, wherein, to determine the workload classification based on at least one performance indicator of the first processor core, the control circuitry is configured to determine the workload classification based on at least one of:
a count of instructions per cycle (IPC);
a count of memory accesses;
a count of branch hits or misses;
a count of translation look-aside buffer (TLB) hits or misses;

a count of cache hits or misses;

a ratio of cache misses to memory accesses;

a ratio of L2 data cache refills to cache misses; or a ratio of L2 instruction cache refills to branch misses.

13. The apparatus of claim 10, wherein the control circuitry comprises a trained machine learning (ML) model instantiated in hardware, a firmware layer, an operating system layer, an application layer, or a combination thereof, and wherein, to determine the workload classification based on at least one performance indicator of the first processor core and to determine the prefetching configuration from the plurality of prefetching configurations based on the workload classification, the control circuitry is configured to provide at least one performance indicator to the ML model and to receive the determined prefetching configuration from the ML model.

14. The apparatus of claim 13, wherein the ML model comprises a decision tree, a neural network, a Vowpal's wabbit, a contextual bandit, a Bayes classifier, a linear classifier, a component analyzer, a transformer, or a combination thereof.

15. The apparatus of claim 13, wherein the ML model is trained prior to its use.

16. The apparatus of claim 10, wherein, to configure at least the first processor core according to the prefetching configuration, the control circuitry is configured to write register settings to at least one control register of the first processor core.

17. The apparatus of claim 16, wherein, to configure at least the first processor core according to the prefetching configuration, the control circuitry is configured to write register settings to at least one control register of at least one other processor core in the many-core system.

18. The apparatus of claim 10, wherein the control circuitry is further configured to periodically perform the prefetch configuration operation for at least one other processor core in the many-core system.

* * * * *